United States Patent [19]
Kollross

[11] Patent Number: 4,577,370
[45] Date of Patent: Mar. 25, 1986

[54] METHOD AND APPARATUS FOR OPENING AXIALLY SHIRRING AND DIVIDING OFF THIN-WALLED, CORD-SHAPED TUBULAR CASING MATERIAL, ESPECIALLY CASINGS MADE OF SYNTHETIC MATERIAL, FOR THE SAUSAGE MANUFACTURE

[76] Inventor: Günter Kollross, Am Wallerstädter Weg 20, D-6080 Gross Gerau-Dornheim, Fed. Rep. of Germany

[21] Appl. No.: 554,240

[22] Filed: Nov. 22, 1983

[30] Foreign Application Priority Data

Nov. 29, 1982 [DE] Fed. Rep. of Germany ....... 3244085

[51] Int. Cl.⁴ .............................................. A22C 11/02
[52] U.S. Cl. .......................................... 17/49; 17/42; 17/33
[58] Field of Search .................. 17/33, 35, 41, 42, 49

[56] References Cited
U.S. PATENT DOCUMENTS 3,112,516 12/1963 Bunnee ..................................... 17/42
4,306,334 12/1981 Niedecker ................................ 17/42
4,358,873 11/1982 Kollross ................................... 17/41

Primary Examiner—Willie G. Abercrombie
Attorney, Agent, or Firm—Larson and Taylor

[57] ABSTRACT

The invention is concerned with a method of opening, axially shirring and dividing off tubular casing material, especially synthetic casing for the sausage manufacture, to form tubular folds or corrugations, and of subsequently conveying the same to a processing location such as, especially, the charging tube of a sausage stuffing machine, with the shirring being performed by pushing forward the tubular casing material against stop means. In accordance with the invention, the said stop means will be put into operation only after the beginning of the advancing movement at a point located in spaced relationship behind the starting end of the tube and is then moved back in accordance with the length increment of the corrugation in the shirring direction. The divided-off tubular corrugations are fed to the processing location by reverting the movement of the stop means in the opposite direction, thereby maintaining an unshirred section permitting an easy closing of the front end of the corrugation for further processing on the stuffing machine.

18 Claims, 21 Drawing Figures

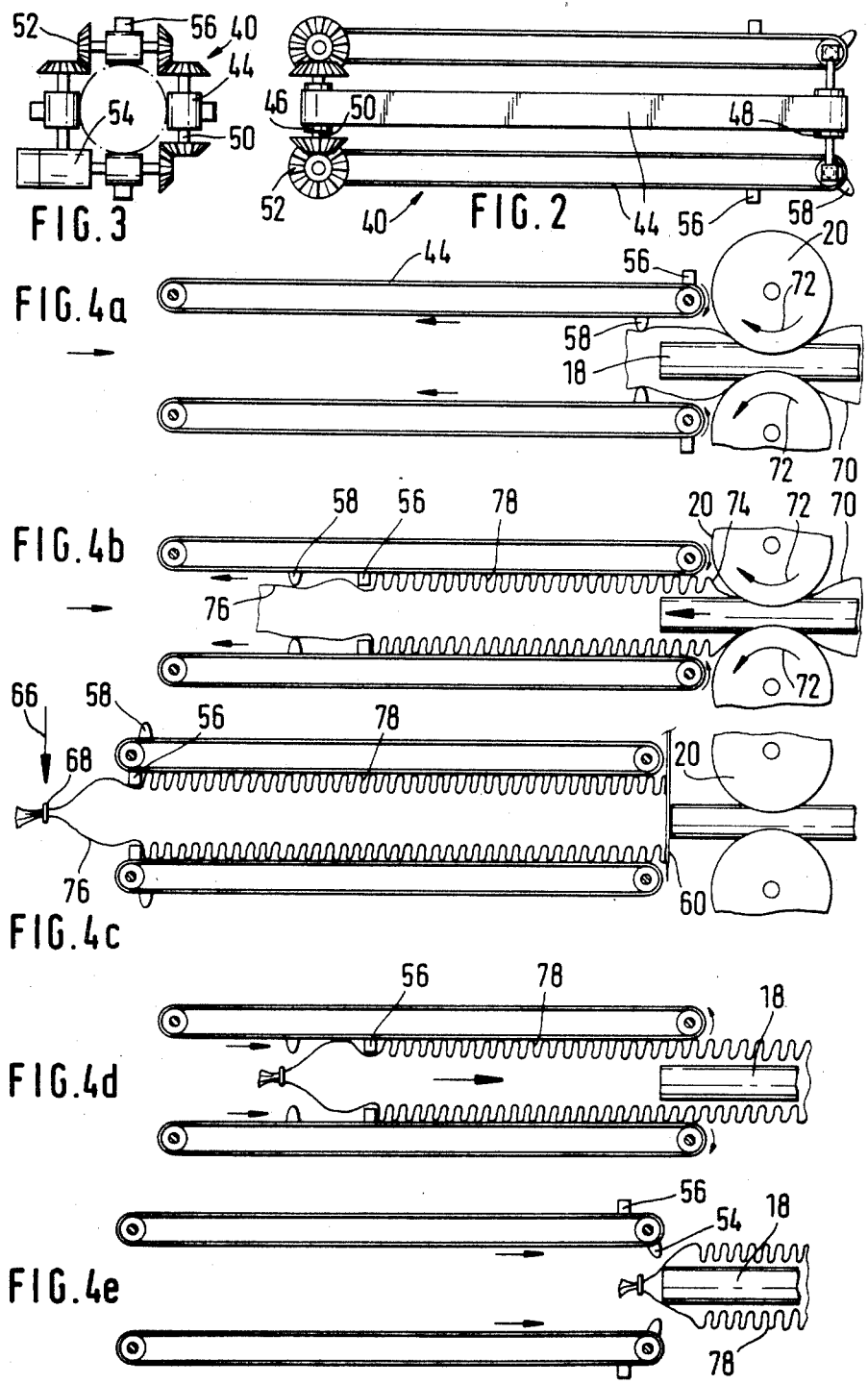

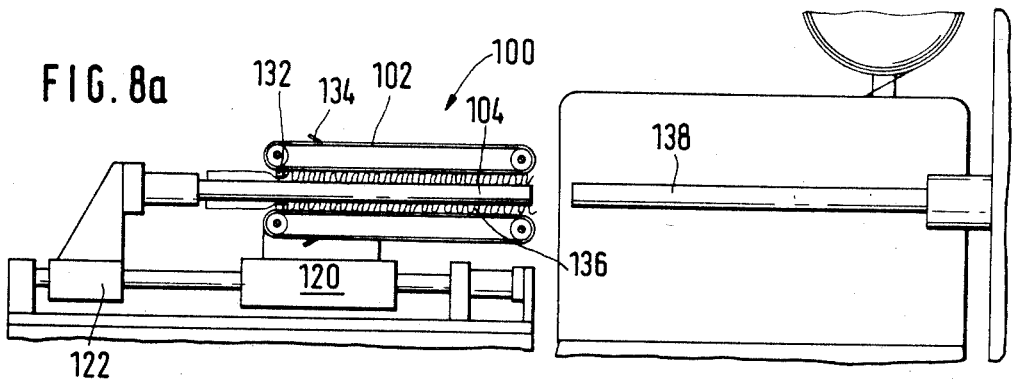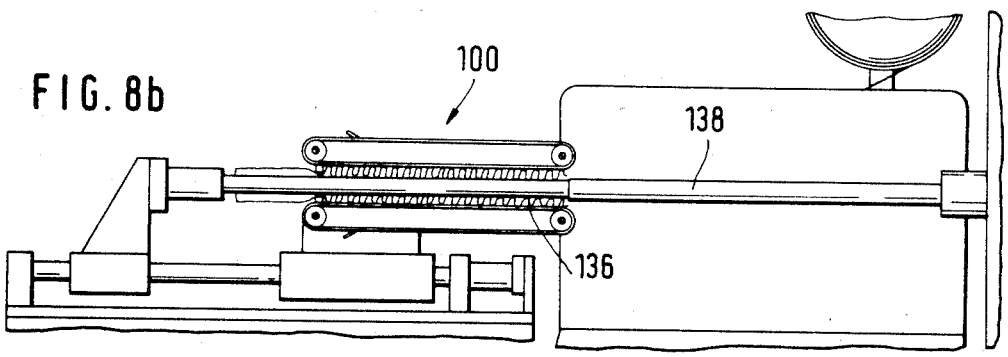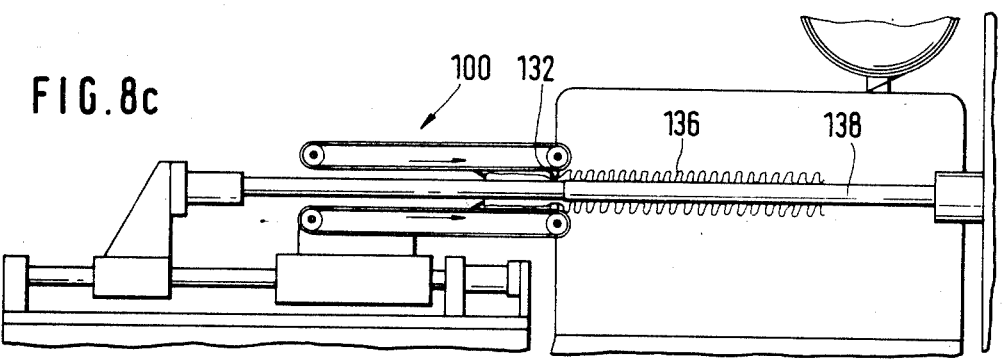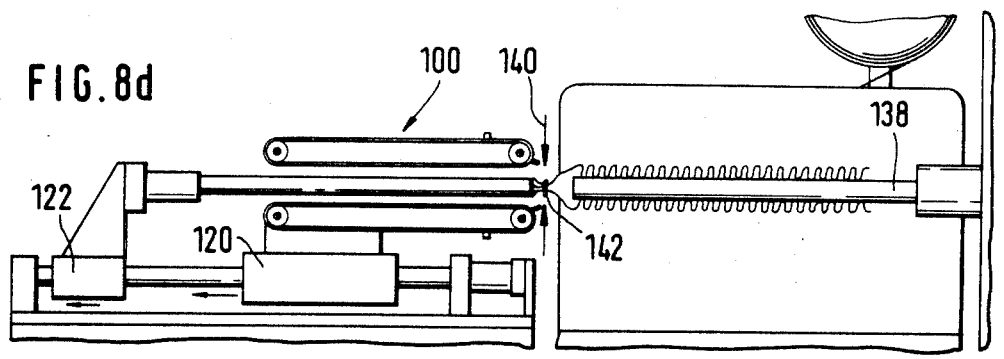

METHOD AND APPARATUS FOR OPENING AXIALLY SHIRRING AND DIVIDING OFF THIN-WALLED, CORD-SHAPED TUBULAR CASING MATERIAL, ESPECIALLY CASINGS MADE OF SYNTHETIC MATERIAL, FOR THE SAUSAGE MANUFACTURE

The present invention is concerned with a method of opening, axially shirring and dividing off thin-walled, tubular casing material, especially casings made of synthetic material, for the sausage manufacture, to form tubular folds or corrugations of a predetermined length, and of subsequently conveying the same in a direction opposite the shirring direction to a processing location, such as the charging tube of a sausage stuffing machine, with the shirring being performed by pushing the opened tubular casing material toward stop means, and an apparatus for implementing such a method.

A method of this type is known from DE-OS No. 29 41 872 using it for automated charging of the filling tube of a sausage stuffing and closing machine, with sections of tubular casing material shirred to form corrugations ready for stuffing. In one exemplary embodiment (shown in FIG. 3 of DE-OS No. 29 41872) shirring is performed on respectively one of a multiplicity of shirring tubes disposed on a revolver, of which the final tubular fold after being divided off the remainder of the tubular casing material and indexing to the next position of the revolver, is conveyed to the charging tube of the stuffing machine by a fluid-operated stripping member. According to another embodiment, shirring is performed in a hollow receiving means formed to two shells which after dividing off is swung to a location ahead of the charging tube, and by the tubular corrugations is pushed onto the charging tube whereupon the shells will open and permit an empty return to the starting position. In either case, the tubular corrugations only at the end of the shirring tube and the shell arrangement, respectively, will strike solid stop means while air is introduced into the shirring tube and the closed half shell under an elevated pressure into the open starting end of the tubular casing material in order to inflate the same.

However, supporting of the tubular material against the stop means during shirring with the end of the corrugations advancing during the subsequent charging operation, will involve difficulties and time loss when setting the first closing clamp at the starting end of the corrugations to be stuffed. In the revolver, this can be done at a later time only after the corrugations having been pushed onto the filling tube, with a stretching of the shirred material in the closing area being required in order to safeguard a faultless fit of the clamp. With the shell arrangement, admittedly, it is possible for the clamp to be set already prior to its being placed ahead of the charging tube. However, here, too, special means are required for seizing and pulling out the starting end of the corrugations through a front orifice of the receiving means between the stop means.

Such difficulties, admittedly, will not occur if, instead of the afore-mentioned process, shirring is done directly on a charging tube, whether a single charging tube or one from a multiplicity of tubes on a revolver, as is the case with the example of embodiment according to FIG. 1 of DE-OS 29 41 872, since the final tubular corrugation according to prior art on the end subsequently advancing during charging is divided off from the remainder of the tubular casing material, and setting of the clamp in a simple manner can be combined with the severing step. However, difficulties in that case are involved with the supply of inflating air as the charging tube still containing leftovers of the forcemeat cannot be used for this purpose.

In conventional shirring of thin-walled tubular casing material to form high-compacted tubular corrugations which, as intermediate products, are processed only later at a different location, it is generally known to move back in controlled manner the stop means usually disposed at the clamping end of a floatingly disposed shirring tube during the shirring operation in accordance with the length increment of the tubular corrugations.

However, the so produced tubular corrugations, as a rule, will be closed at the starting end with the consumer only, after their being pushed onto the charging tube and after their being drawn through the casing brake mounted on the charging tube opening.

It is an object of the invention to improve a process of the afore-mentioned type to the effect that by maintaining the requirements for the simple supply of inflating air, close shirring of the tubular material is permitted, with an unshirred starting end of the corrugations as formed being at the same time provided then permitting in simple manner the setting of the closing clamp.

In accordance with the invention, this problem is solved in that the stop means are caused to become operative only after the start of the feeding movement at a point of the tubular material located at a space behind the starting end of the tube, and then in known manner are returned in accordance with the length increment of the tubular folds in the shirring direction, and that the divided off tubular folds or corrugations are supplied to the processing location by switching the movement of the stop means to the opposite direction.

By deliberately rendering operative the stop means only after the beginning of the feeding movement at a space behind the starting end of the tube, the tubular material till then will remain unshirred whereas from the very beginning, close folding behind the stop means is safeguarded. As the stop means with an opposite direction of movement at the same time is used for conveying the ready-for-stuffing corrugations as formed to the processing location, the unshirred section here, too, is maintained permitting a simple closing-off of the front end of the corrugations, as is especially required for the further processing on the charging tube of a sausage stuffing machine.

According to a preferred embodiment of the method of the invention, the formatiom of the unshirred initial section can be further favored in that the tubular casing material at the beginning of the advancing movement is seized at the starting end thereof and is drawn at a speed corresponding to the feeding movement in the feeding direction until the stop means becomes operative. It is apparent that bucklings, if any, during pushing forward the casing in the initial region thereof, in this manner are avoided. As soon as the stop means have been brought into an effective position, the drawing movement at the speed by which the length of the corrugations increases, is continued.

According to another advantageous embodiment of the method of the invention, the tubular casing material is opened after severing from the remainder of the casing material in the unshirred initial region before the tubular corrugations are fed to the processing location.

Dead times prior to processing of the tubular corrugations are thereby avoided and at the same time, during drawing of the tubular corrugations on an elongated carrier, such as the charging tube of a sausage stuffing machine, a natural limitation is provided at the processing location.

For implementing the method of the invention in practice, an arrangement is used comprising a shirring tool, a casing opening and feeding means including a floatingly arranged shirring tube, a receiving means adapted to be coupled thereto and provided with stop means for the tubular casing material as pushed forward, a separating means for dividing off the tubular corrugations taken up by the receiving means from the remainder of the tubular casing material and means for placing the receiving means along with the separated tubular corrugations ahead of the processing location, with the stop means being disposed in accordance with the invention in a manner radially controlled and axially movable on the receiving means.

A first advantageous embodiment of such an arrangement is characterized in that the receiving means includes at least two endless conveyor belts drivable in synchronism and receiving therebetween the tubular corrugations during shirring. It will be possible for revolving stop members to be located on the endless conveyor belts which, at the reversing points of the conveyor belts can be swung out of the inner area of the receiving means. Moreover, revolving fingers for seizing the tubular starting end may be provided on the endless conveyor belts, and the speed of the endless conveyor belts can be switched from a magnitude corresponding to the advancing speed of the tubular material to a magnitude corresponding to the length increment of the shirred corrugation.

Another advantageous embodiment of the arrangement of the invention resides in that the receiving means includes a central mandrel for receiving the shirred tubular casing material. The mandrel, feasibly, is formed as an elongated tube having at least two circumferentially distributed longitudinal slits; provided in the tube are longitudinally displaceable elements for supporting and controlling stop members radially movable outwardly through the longitudinal slits and displaceable along the longitudinal slits, which stop members, preferably, are formed of stop members adapted to swing out through the elongated slits. Such a mandrel also can be used in conjunction with the afore-mentioned conveyor belts facilitating the transfer of the tubular corrugations formed thereon especially in the event that an elongated member of the same diameter as or of a smaller diameter than the mandrel such as, especially the charging tube of a sausage stuffing machine, is provided on the processing location.

A still further embodiment of the arrangement according to the invention provides for the receiving means to include a number of elongated guide members distributed along the tubular corrugations to be received, on which are located longitudinally displaceable elements for supporting and controlling stop members movable between the guide members radially inwardly and displaceable along the guide members. It is also in that case that the stop members, feasibly, can be formed by stop levers swingable between the elongated guide members into the interior of the receiving means. The stop members, in an alternative embodiment, also can be formed of the free ends of the piston rods of fluid cylinders that are longitudinally displaceable on the outer sides of the guide members.

Moreover, in respect of all of the afore-mentioned arrangements an advantageous improvement emerges from the fact that the receiving means is arranged in a manner axially controlled and displaceable, and in a position retracted from the casing opening and advancing means for connection to the processing location can be laterally moved away.

The invention will now be described in detail with reference to a number of examples of embodiment of arrangements and devices for implementing the method of the invention as illustrated in the drawings, wherein FIG. 1 is a highly schematic and perspective view of a first apparatus for implementing the method of the invention, including a receiving means formed of endless conveyor belts for the tubular corrugations to be transferred from a casing opening and feeding means to the charging tube of a sausage stuffing machine;

FIG. 2 is a side view of the receiving means according to FIG. 1;

FIG. 3 is a front view of the receiving means according to FIG. 1;

Figure 1:
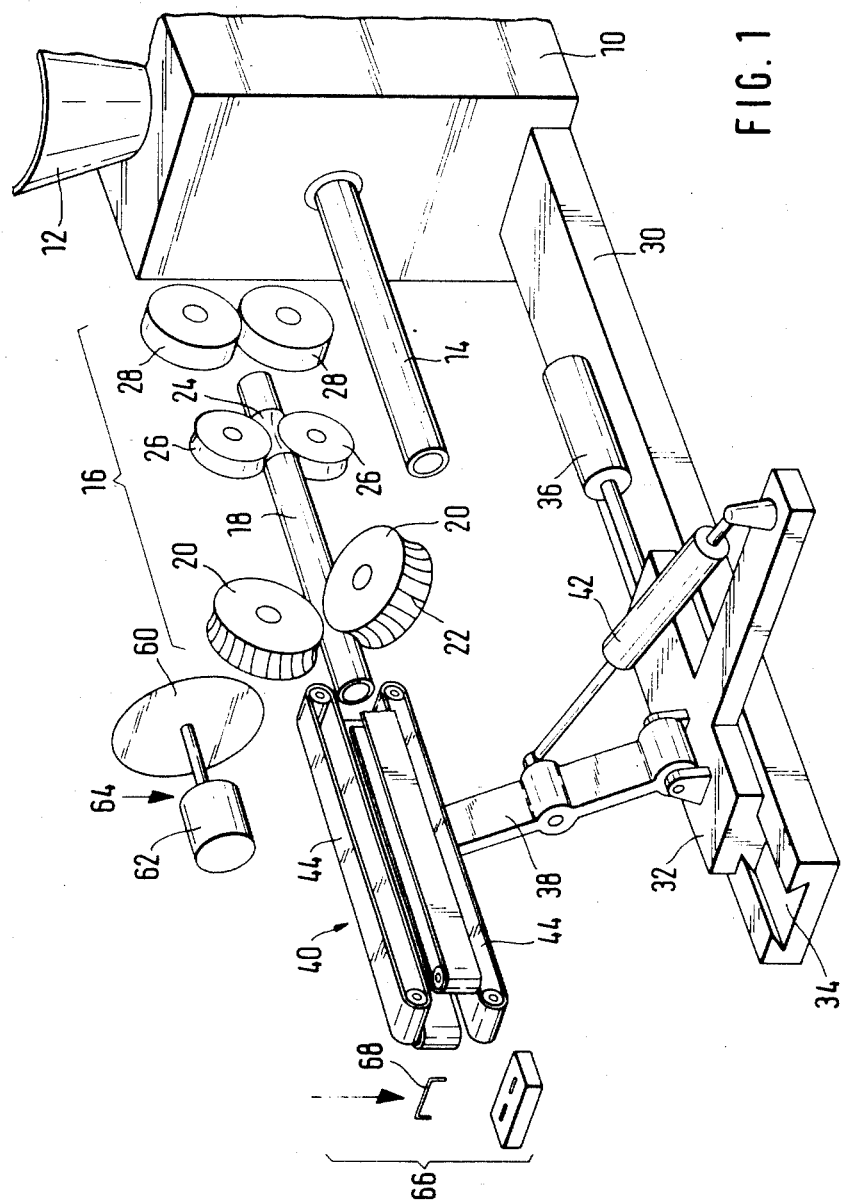
Figure 5:
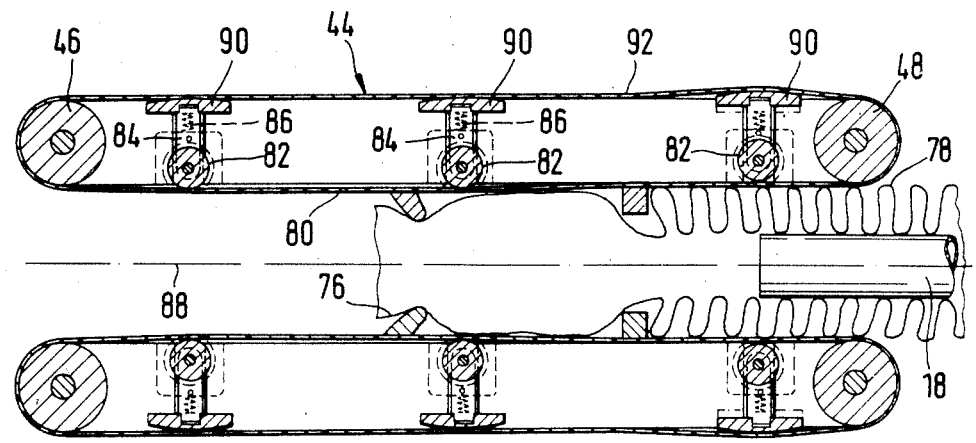
Figure 6:
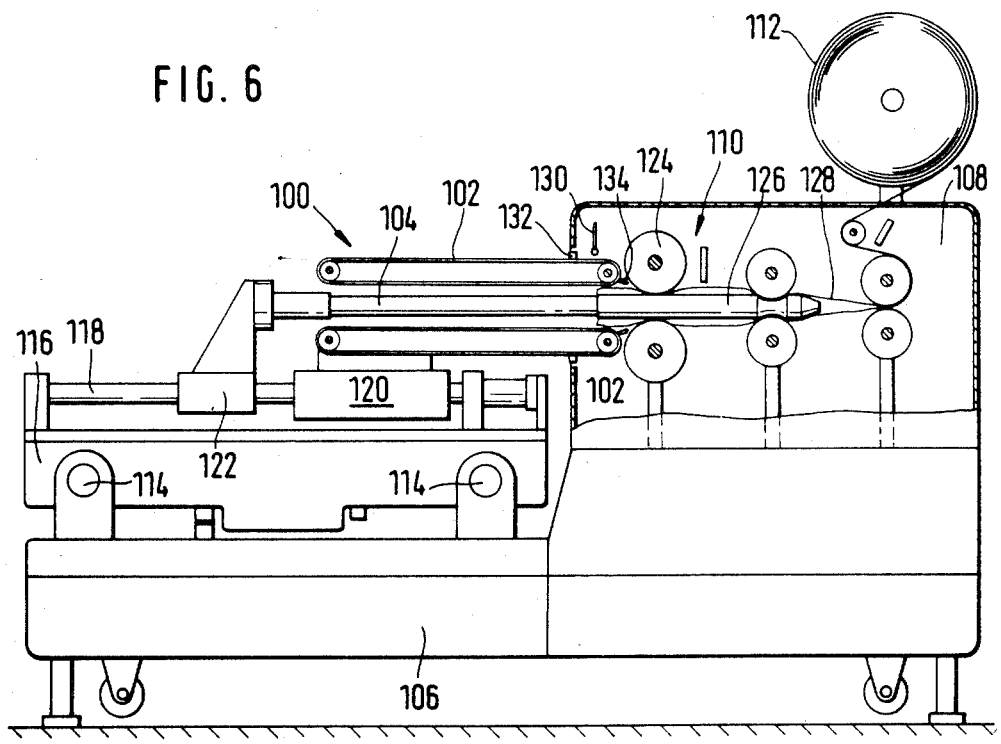
Figure 9:
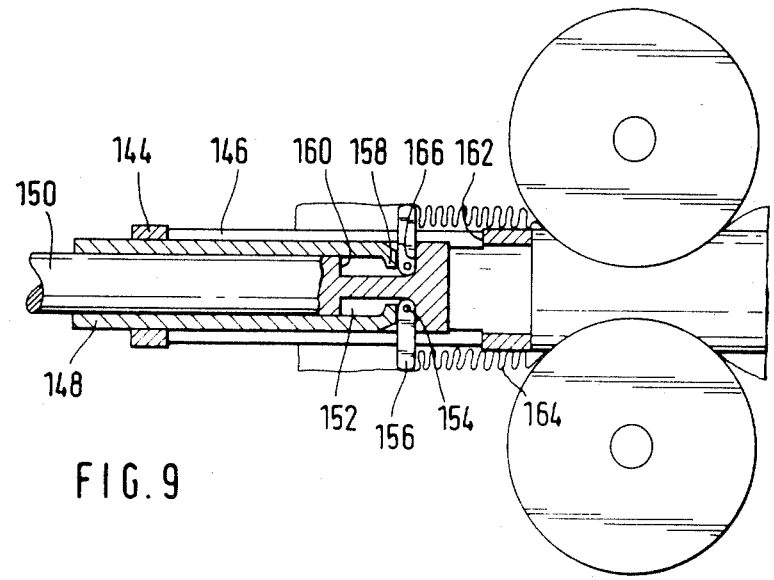
Figure 10:
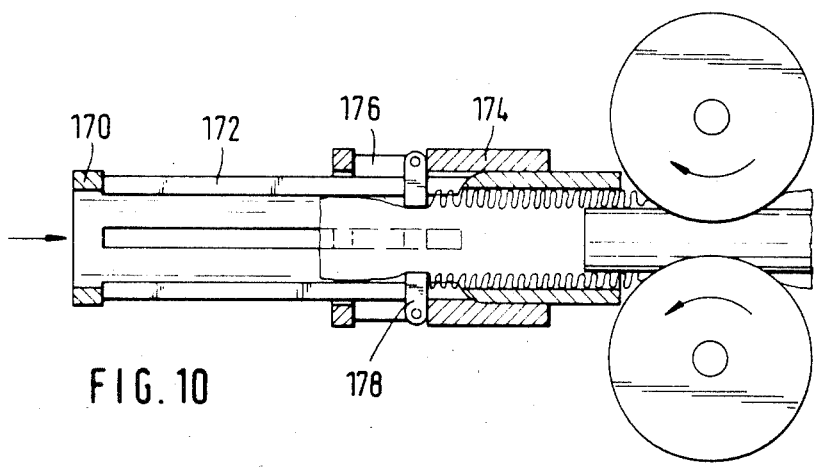
Figure 11:
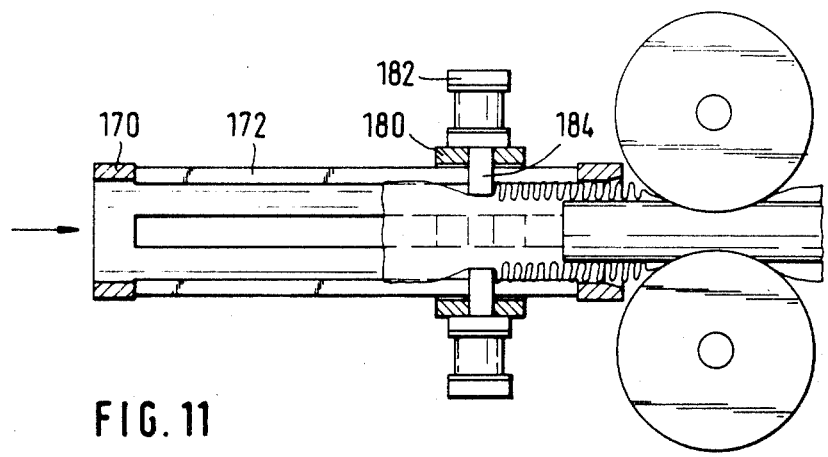

FIGS. 4a-e show longitudinal sections through the receiving means according to FIGS. 1 to 3, and parts of the casing opening and feeding means and of the charging tube, respectively, in various phases of a working cycle;

FIG. 5 shows a highly schematic longitudinal section through a modified example of embodiment of the receiving means according to FIGS. 1 to 3, wherein the endless conveyor belts are resiliently supported between reversing points;

FIG. 6 schematically shows the side view of the arrangement of a casing opening and feeding means combined to form one apparatus, and of a receiving means movable on a cross side for the shirrings, with endless conveyor belts and a central shirring tube;

FIGS. 7a-d show details of partial views of FIG. 6 in other phases of the apparatus;

FIGS. 8a-d show further details of partial views of the receiving means in various phases when transferring a shirring to the charging tube of a sausage stuffing machine;

FIG. 9 shows a longitudinal section through a receiving means formed by a tubular mandrel, provided with stop levers that can be swung into an operative position from the inside through longitudinal slits;

FIG. 10 is a longitudinal section through a receiving means formed of a slitted casing, with stop levers adapted to be swung inwardly through the slits, and FIG. 11 shows a similar receiving means as the one illustrated in FIG. 10 in which the stop members are formed of the piston rods of fluid cylinders.

Referring to the drawings, in the arrangement according to FIG. 1, numeral 10 refers to a sausage stuffing machine having a stuffing horn 12 and a charging tube 14. Through the charging tube 14, forcemeat prepared within the stuffing machine, in known manner is stuffed into the tubular casing previously drawn onto the charging tube 14 and resiliently held against the filling pressure of the forcemeat through a casing brake (not shown) flexibly overlapping the charging tube opening. Ahead of the charging tube is, furthermore, provided a closing mechanism (not shown) for the setting of closing clamps which is removed, e.g. laterally swung off, along with the casing brake when mounting a new tubular casing.

Disposed next to the charging tube 14 is a casing opening and feeding means which is generally designated by reference numeral 16, the main details of which are illustrated schematically only. The casing opening and feeding means 16 mainly comprises a floatingly arranged shirring tube 18 and a shirring means 20 which in the example as shown is formed of three shirring wheels distributed about shirring tube 18 and drivable in synchronism, with the wheels, feasibly, being circumferentially provided with teeth or sections 22.

Shirring tube 18 is provided with a necking 24, in longitudinal section of an arc-shaped configuration, and engaged by two guide rolls 26 centering the shirring tube 18 and at the same time holding it against axial displacement. Guide rolls 26 seize shirring tube 18 through the tubular casing material (not shown in FIG. 1) that is supplied in a flat condition from a supply roll (not shown) between two pressure rollers 28 behind which the tubular casing material is opened with the aid of the shirring tube 18 to its circular cross-section.

The end of the shirring tube 18 which is the rear one viewed in the shirring direction is located in approximately the same transverse plane and at the same level as the opening of the charging tube 14. Provided on an elongated base plate 30 disposed therebelow is a bearing block 32 in a guide 34, that is longitudinally displaceable with the aid of a power cylinder 36. A supporting lever 38 is mounted on bearing block 32, supporting a receiving means generally designated by reference numeral 40, which by means of a power cylinder 42 is reciprocable between a position in alignment with the shirring tube 18 and a position in alignment with the charging tube 14.

As especially revealed by FIGS. 2 and 3, the receiving means 40 comprises four endless conveyor belts 44 of elongated configuration distributed about the longitudinal axis, which belts are guided on a frame (not shown) about pulleys 46,48. Pulleys 46 are seated on shafts 50 that are drivingly coupled via bevel gear pairs 52 and by a driving motor 54 having two variable speeds are drivable in synchronism, while pulleys 48 are freely rotatable.

Each endless conveyor belt 44 at the outer side thereof carries a stop means 56 and ahead thereof in spaced relationship carries a follower finger 58 which upon rotation of the endless conveyor belts in the shirring direction are first swung successively inwardly about the pulleys 48 and are then axially moved through the interior of the receiving means 40. All stop means 56 and all follower fingers 58 are disposed respectively in a common transverse plane relative to the longitudinal extension of the receiving means 40.

In FIG. 1, reference numeral 60 refers to a cutting tool configured as a cut-off wheel drivable by an electic motor 62 and movable by a power cylinder (not shown) in the direction of the arrow 64 between the shirring tube 18 and the receiving means 40.

Reference numeral 66 designates a closing mechanism for setting closure clamps 68 on the end of a tubular shirring protruding from the receiving means 40, which closing means is arranged behind the receiving means 40 in extension of the shirring tube 18; reference will be made thereto in greater detail further down.

The way of operation of the arrangement as described is as follows:

It should be assumed that the receiving means 40 with the aid of the power cylinder 42 is swung ahead of the casing opening and feeding means and, by way of the power cylinder 36, is placed into a position overlapping the end of the shirring tube 18 (FIG. 4a) and, moreover, it should be assumed that tubular casing material 70 after having passed the pressure rolls 28 and opening through the shirring tube 18 underneath the shirring wheels 20 is introduced into the casing opening and feeding mechanism 16 and the front end thereof approximately snugly ends up at the front end of the shirring tube 18.

In that starting position, the shirring wheels 20 in the direction of the arrows 72 (FIG. 4a) are switched on, pushing the tubular casing material 70 forwardly into the receiving means 40. At the same time, driving motor 54 for the endless conveyor belts 44 is switched on to operate at the higher of the two possible speeds causing by the drive of the conveyor belts the follower fingers 58 to seize the front end of the tubular casing and to entrain the same along the receiving means 40.

As the endless conveyor belts 44 rotate, stop means 56 also reach the region of the pulleys 48 and are swung inwardly into the interior of the receiving means where in their turn they seize the tubular casing material 70. As soon as this has been done, driving motor 54 for the endless conveyor belts 44 is switched over to its lower speed with the consequence that stop means 56 and follower fingers 58 travel through the receiving means 40 substantially more slowly than the tubular casing material 70 is advanced by the shirring wheels 20. The tubular casing material 70 still in the region of the shirring tube 18 is thereby pleated at 74 and shirred while the initial section 76 of the tubular casing material continues to be drawn unshirred by the fingers 58 through the receiving means 40 (FIG. 4b).

Finally, the follower fingers 58 reach the pulleys 46 of the endless conveyor belts 44 and are swung out of the interior of the receiving means 40 while the stop means 56 continue their movement within the receiving means up to the pulley 46. The unshirred front end 76 of the tubular casing material is thereby pushed out of the receiving means 40 into the area of the closing means 66 while the receiving means 40 along the entire length thereof contains a tubular shirring 78 formed by the shirred tubular casing material. In that condition both the shirring wheels 20 and the endless conveyor belts 44 are rendered inoperative and the receiving means 40 with the aid of the power cylinder 36 is moved away from the shirring tube 18. In that position, closing means 66 will set a closing clamp 68 on the unshirred end 76 of the tubular casing material, and motor 62 of the separating means is switched on and the cut-off wheel 60 is moved through the cavity provided between the shirring tube 18 and the receiving means 40 for severing the tubular material 70 (FIG. 4c).

The receiving means will now be swung with the aid of the power cylinder 42 to a point ahead of the charging tube 14 and, by power cylinder 36, from which the respective closing means along with the casing brake has been removed, is drawn thereon by a predetermined distance (FIG. 4d). By turning on driving motor 54 in the opposite direction of rotation as shown in FIG. 4d, the tubular corrugation or shirring 78 by stop means 56 is pushed onto the charging tube 14 and, at the other end, first top means 56 and then revolving fingers 58 about pulleys 48 are again swung out of the interior of the receiving means 40 (FIG. 4e).

By actuating again the power cylinder 36 and 42, the receiving means can thereupon be returned into the starting position as shown in FIG. 4a.

The endless conveyor belts 44 at the outer sides thereof may be toothed or corrugated or otherwise profiled (not shown). The folds of the tubular corrugation will thereby be better seized and especially it is avoided in separating the receiving means 40 from the shirring tube 18 with the aid of the power cylinder 36 that a part of the tubular corrugation is again pulled out of the receiving means 40.

In the modified embodiment of the receiving means 40 as shown in FIG. 5, the inner sides 80 of the endless conveyor belts 40 are supported by rolls 82 between pulleys 46,48 which rolls are mounted on slides 84 biased by springs 86 in the radial direction to the central longitudinal axis 88 of the receiving means 44. Moreover, slides 84 at the radially outer ends thereof are provided with shoes 90 supported against the outer sides 92 of the endless conveyor belts 44 thereby maintaining an equal distance between the endless conveyor belts. Owing to this construction, an additional radial retaining force is exerted on the tubular corrugation 78 received by means 40, and tubular casings of differently sized diameters can also safely be seized.

FIG. 6 shows an apparatus with a different arrangement and construction of the receiving means, which is generally designated by reference numeral 100 and which comprises in addition to endless conveyor belts 102 equally used there, a central mandrel configured as an elongated tube 104 extending centrally between conveyor belts 102.

The apparatus comprises a machine bed 106 having a machine column part 108 on which are mounted the casing opening and feeding means 110 and a supply roll 112 for the tubular casing material to be processed.

In addition to the column 108, the machine bed 106 carries a transverse carriage 116 mounted on guide rods 114, which transverse carriage, in turn, carries elongated guide rods 118. Displaceably disposed on guide rods 118 is a first slide 120 carrying the endless belts 102 along with the guide and driving means (not shown).

Moreover, a second slide 122 is slidably arranged on guide rods 118 to which the elongated tube 104 forming the mandrel is floatingly secured. Both sides 120, 122 and transverse carriage 116 are provided with drives preferably in the form of power cylinders (not shown).

The casing opening and feeding means 110 is of an identical configuration as means 16 according to FIG. 1; it includes at least two shirring wheels 124 and a shirring tube 126 extending therebetween via which a tubular casing material 128 is supplied to the shirring wheels 124.

Moreover, a separating means 130 is provided illustrated here in the form of a glow filament adapted to be passed in heated state through the casing material.

Conveyor belts 102, as in the afore-described embodiment, carry stop means 132 and revolving fingers 134 which, in the starting position as shown in FIG. 6, are still swung out of the interior of the receiving means.

Figure 7A:
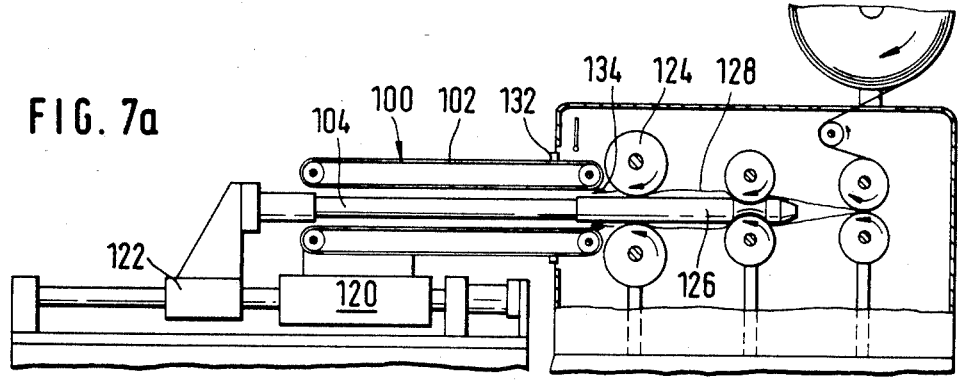
Figure 7B:
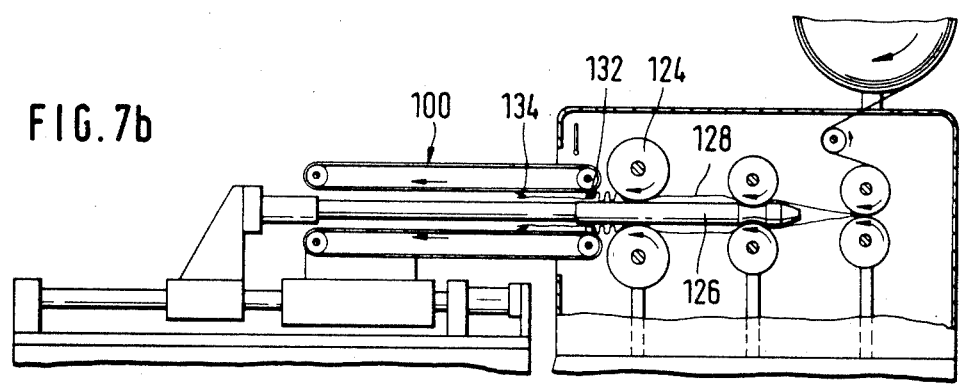

The way of operation of the apparatus according to FIG. 6 is similar as the one according to FIG. 1, details of which are revealed by FIGS. 7a to d and 8a to d:

After the conveyor belts 102 and the tube 104 along with the carriage 116 having been placed to a point ahead of the casing opening, and feeding means 110 and slides 120, 122 having been advanced toward the shirring tube 126 such that tube 104 is in abutment with shirring tube 126 and conveyor belts 102 overlap the end of shirring tube 124 (FIG. 6) shirring wheels 126 along with conveyor belts 102 are turned on in the direction as indicated by the arrows in FIG. 7a, with the endless conveyor belts 102 being first again driven at the higher of the two speeds. Revolving fingers 134 will seize the front end of the tubular casing material 128 pushed forward by the shirring wheels 124, entraining the same when passing through the receiving means.

Figure 7C:
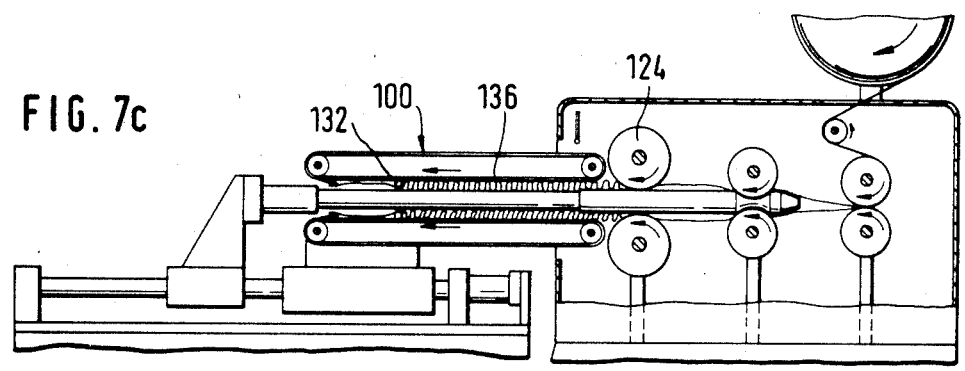
Figure 7D:
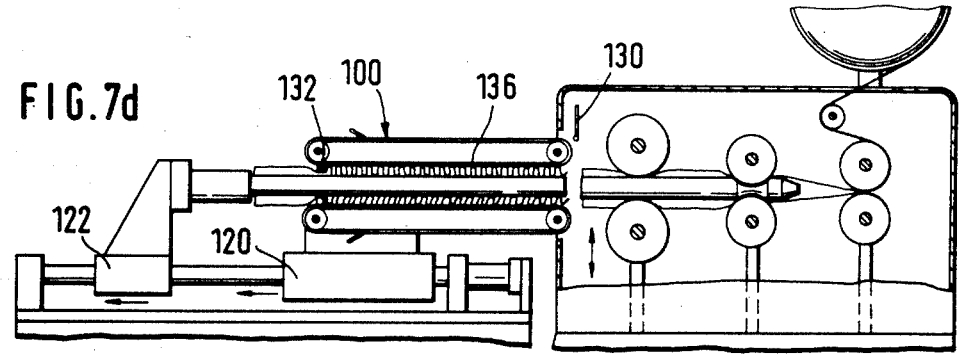

As soon as stop means 132 have seized the tubular casing material conveyor belts 102 will be switched to lower speeds (FIG. 7b), and the tubular material is shirred to form an increasingly extended corrugation 136 (FIG. 7c).

With the corrugation having reached the full length of the receiving means (FIG. 7d), the drives of the shirring wheels 124 and the endless conveyor belts 102 will be switched off, and slides 120, 122, by shirring tube 126, are moved between shirring tube 126 and receiving means to form a gap between the latter through which the separating means 130 is passed for dividing off the corrugation from the remainder of the tubular casing material.

Now the transverse carriage 116 along with the receiving means and the tubular corrugation contained therein are placed into the position ahead of the charging tube 138 of the stuffing machine (FIG. 8a), and slides 102, 122 are again moved forward to such an extent that the endless conveyor belts 102 overlap the front end of the charging tube 138, and the tube 104 immediately follows the charging tube 138 (FIG. 8b). After that the drive of the endless conveyor belts 102 is turned on in the opposite direction causing stop means 132 to push the corrugation onto the charging tube 138 (FIG. 8c).

With the entire corrugation pushed onto the charging tube 138, slides 120,122 are moved back, and a closing clamp 142 is set with the aid of the closing means of the stuffing machine as indicated by arrows 140.

Thereupon the receiving means with the aid of carriage 116 and slides 120, 122 will move back into the position according to FIG. 6 while the stuffing machine is turned on to commence stuffing of the tubular casing material provided, with the tubular corrugation drawn on.

FIG. 9 shows a tubular mandrel 144 which by itself or in conjunction with endless conveyor belts according to FIG. 6 can form the receiving means. Tubular mandrel 144 is provided with a plurality of circumferentially distributed longitudinal slits 146 receiving an inner tube 148 displaceable therein and a central pushbar 150 displaceable in the said inner tube 148. The central pushbar is provided with recesses 152 that are oppositely arranged in the longitudinal slits 146 and that are crossed by axes 154 on which top levers 156 are mounted. The inner tube 148 at the end thereof is provided with radially inwardly directed stops 158 limiting the movement between the inner tube 148 and the pushbar.

When displacing the pushbar 150 from the position as shown in FIG. 9 to the right, the inner tube 18 will first remain at a standstill until the stop means 158 have been seized by the end edges 160 of the recesses 152. When the pushbars 150 are displaced further to the right, stop levers 156 are pushed against the end edges 162 of the longitudinal slits 146 in the tubular mandrel 144 and are folded inwardly until the ends thereof are in abutment with the end of the inner tube 148. In that position, stop levers 156 are completely counterbored within the tubular mandrel 144.

In order to right the stop levers 156, hence, placing them into an operative position over the tubular material 164 to be shirred, pushbar 150 is first moved to the left without the inner tube 148, with the end edge of the inner tube 148 erecting the stop levers 156, placing them into abutment with the shoulder faces 166 at the end of the recesses 152 of the pushbar. Accordingly, in this manner the stop levers 156 can be swung into and out of the operative position relative to the casing material. However, no stop fingers for seizing the unshirred starting end of the tubular casing material are provided here. If need be, they can be provided on corresponding conveyor belts, as in the preceding examples of embodiment.

In the example of embodiment according to FIG. 10, the endless conveyor belts have been replaced by sleeve 170 which, like the tubular mandrel 144 of FIG. 9, is provided with circumferentially distributed longitudinal slits 172. Slidably movable on sleeve 170 is an outer sleeve 174 of a substantially reduced length, having correspondingly arranged slits 176 in which stop levers 178 can be swung from a position completely received by the elongated slits 172 into the operative position as illustrated, wherein the top levers 178 are directed radially inwardly. For operating stop levers 178, means (not shown) similar to those as used with the tubular mandrel according to FIG. 9 can be used.

FIG. 11 shows a modified embodiment of the receiving means according to FIG. 10 in which the outer sleeve has been replaced by a sleeve ring 180 carrying at the outer side thereof a plurality of circumferentially distributed hydraulic or pneumatic power cylinders 182 the piston rods of which 184, through corresponding bores in the sleeve ring 180, engage the longitudinal slits 172 and, upon actuation of the power cylinders, are pushed forward into the interior of the sleeve 170 into the operative position.

It is clear that in the embodiments according to FIGS. 10 and 11, corresponding drive means are provided by way of which the outer sleeve 174 and the annular sleeve 180, respectively, in accordance with the length increment of the corrugation as formed, during shirring are displaced in the one direction and later, during conveyance of the shirred material onto the charging tube, are displaced in the opposite direction.

In all instances inflatory air can be blown into the tubular material to be shirred. In the example of embodiment according to FIG. 9, a central bore will have to be provided in the pushbar for this purpose.

What is claimed is:

1. A method for producing link sausages using tubular casing material which is wound on a reel in a flat condition, the method comprising;
   unwinding a predetermined length of casing material from said reel,
   opening said predetermined length of casing material to a tubular cross section,
   moving a first point near the forward end of said tubular casing material into gripping engagement with a first gripping means,
   synchroneously moving the first gripping means and the forward end of said predetermined length of tubular material for a predetermined distance,
   gripping the tubular casing material by a second gripping means at a spaced point spaced by said predetermined distance from the first point, which predetermined distance corresponds to the distance which the tubular casing material and said first gripping means have moved,
   moving the second gripping means together with the tubular casing means in the same direction but with a reduced speed relative to the unwinding speed of the casing material to axially shir the casing material to form a shirred length of tubular casing material having circumferential folds, with the portion of said casing material situated between said first point and said spaced point remaining unshirred,
   cutting off said shirred length of tubular casing material from the remainder of the casing material,
   laterally moving said shirred length of tubular casing material into a position ahead of the charging tube of a sausage filling machine and positioning said shirred length onto said charging tube, and
   filling and closing said tubular casing material on said charging tube with sausage meat.

2. The method of claim 1, including the step of closing off the forward end of the shirred length before said laterally moving step.

3. The method of claim 1, including the step of closing off the forward end of the shirred length of material after said laterally moving step but before filling the tubular casing material.

4. An apparatus for producing link sausages using tubular casing material which is wound on a reel in a flat condition, comprising:
   means for feeding the wound casing material and for opening the casing material to a tubular cross-section,
   a receiving means for receiving the tubular casing material,
   said receiving means including a first gripping means for gripping a point near the forward end of the tubular casing material,
   said receiving means including a means for synchronously moving the first gripping means and the said forward end for a predetermined distance,
   said receiving means further including a second gripping means for gripping the tubular casing material at a spaced point spaced by said predetermined distance from the first point, which predetermined distance corresponds to the distance which the tubular casing material and said first gripping means have moved since the first gripping means grip the tubular casing material,
   said receiving means having means for moving the second gripping means together with the tubular casing material in the same direction but with a reduced speed relative to the feeding means to thus axially shir the casing material to form a shirred length thereof which has circumferential folds, leaving the portion of said casing material between said first point and said spaced point unshirred,
   cutting means for cutting off said shirred length of tubular casing material from the remainder of the casing material,
   means for laterally moving the shirred length of tubular casing material to a position ahead of a charging tube of a sausage filling machine and means for positioning said shirred length onto said charging tube, thereby positioning said shirred length to be filled with sausage meat, and
   means for closing the forward end of the shirred length prior to filling.

5. An apparatus according to claim 4, said receiving means comprising at least two endless conveyor belts which are driveable in synchronism with each other, which belts receive the tubular cross-section casing material therebetween.

6. An apparatus according to claim 5, said second gripping means being fixed on said belts, and positioned thereon to be movable out of the space between the belts for positioning prior to receiving of the forward end of the tubular casing material between said belts.

7. An apparatus according to claim 6, wherein said first gripping means is mounted on said belts and positioned to be moved out from the space between the belts before the receiving means receives the forward end of the tubular cross-section casing material, and means for driving the endless belts at two speeds including a first speed for engaging the casing material with the first gripping means until gripping of the casing material with the second gripping means, and a second speed after said gripping with the second gripping means which is slower than the unwinding speed of the casing material to permit shirring of the tubular casing material behind said second gripping means.

8. An apparatus according to claim 5, wherein the facing surfaces of said conveyor belts include a raised profile such as teeth, corrugations or the like.

9. An apparatus according to claim 5, wherein the distance between the conveyor belts is adjustable.

10. An apparatus according to claim 9, including means for resiliently supporting at least the facing surfaces of the two conveyor belts.

11. An apparatus according to claim 5, said receiving means including a central mandrel positioned between the belts for receiving the tubular casing material.

12. An apparatus according to claim 11, said mandrel comprising an elongated tube having at least two longitudinally extending, circumferentially spaced apart slits, stop members located in said slits and movable radially outwardly from said slits and displaceable longitudinally along said slits, and longitudinally displaceable elements within said mandrel for supporting and controlling said stop members.

13. An apparatus according to claim 12, said stop members comprising stop levers mounted to be swung out through the longitudinal slits.

14. An apparatus according to claim 4, said receiving means comprising a sleeve having a plurality of longitudinally extending slits formed therein, which slits are spaced apart circumferentially, displaceable elements mounted on the sleeve and movable along the slits, and stop members mounted on the displaceable elements and movable radially inwardly through the slits to engage the tubular casing material therein and constitute at least one of said gripping means.

15. An apparatus according to claim 14, said stop members being formed as stop levers adapted to pivotally swing through the slit into the space within the sleeve to engage the tubular casing material or out through the slit, out of engagement with the tubular casing material.

16. An apparatus according to claim 14, said stop members formed as the free ends of fluid operated pistons which reciprocate within the displaceable elements within which they are mounted.

17. An apparatus according to claim 14, said stop members being formed as the armatures of electro magnets that are movable towards and away from their respective displaceable elements.

18. An apparatus according to claim 4, including means for moving the receiving means axially towards and away from the wound casing material feeding means, and said means for laterally moving the receiving means being operable after the receiving means has been moved axially away from said feeding means.

* * * * *